←SOLVENT VAPOR

INVENTOR.
JAMES E. YOUNG
BY
ATTORNEYS

3,556,782
Patented Jan. 19, 1971

3,556,782
METHOD OF FORMING HIGH DENSITY MATERIAL ARRAYS
James E. Young, Pittsford, N.Y., assignor to Xerox Corporation, Rochester, N.Y., a corporation of New York
Continuation-in-part of application Ser. No. 549,254, May 11, 1966. This application Sept. 29, 1967, Ser. No. 675,744
Int. Cl. G03g 13/22
U.S. Cl. 96—1.1
10 Claims

ABSTRACT OF THE DISCLOSURE

Method and apparatus for producing high density material arrays by forming precise depressions in a deformable member which is then cascaded with a suitable material, either particulate or non-particulate, which fills these depressions.

CROSS REFERENCE TO RELATED APPLICATION

This application is a continuation-in-part of copending application Ser. No. 549,254, filed May 11, 1966, now abandoned.

BACKGROUND OF THE INVENTION

This invention relates to methods for achieving spatial orientation of material, and more particularly, to methods for achieving precision orientation of portions of material in two and three dimensional matrices of determinate form.

The present invention was conceived in one instance in response to a long experienced need for efficient and economical methodology suitable for building up two and three dimensional structures of the type including large numbers of relatively tiny, precious particles, of necessity positioned at precise and predetermined points within the structures. Structures of this variety find particular application in the field of nuclear reactor technology and so forth, where the aforementioned particles commonly take the form of minute metallic beads—as for example, comprising the element niobium—which are positioned in precise three-dimensional arrangements in order to assure maximum scattering characteristics for the amount of the precious metal employed. Needless to say, however, the method subsequently to be set forth is not limited to producing materials for such exotic applications but may be utilized in any instance where it becomes desirable to build up structures having inclusions at precise points thereof, as for example, might be the case where one merely desired to create decorative materials of novel and interesting design.

In another instance, the present invention was conceived in response to a need for producing a lens matrix having a high density for utilization in many fields. This lens matrix is referred to collectively as a fly's or frog's eye lens, since it closely imitates nature in this respect. An example of the employment of such a high density lens is in holography where each spherical lens in the matrix forms an individual image from a slightly different angle of the subject being reproduced. The minute lenses sample and record both the intensity of light and the curvature and direction of the light waves coming from every point on the subject being photographed. The quality of the hologram resulting from this technique is enhanced by increasing the density of the individual lenses in the lens matrix or fly's eye lens. Conventional techniques of grinding or selective etching cannot possibly provide a high enough density to achieve the superior results possible.

The uses of a high density fly's eye lens are too numerous to mention individually. Holography provides a good example of the uses to which such a lens can be put. One other important use of these lenses where the density of the lens is directly related to the superiority of the system is in the case of high density data storage and retrieval devices where these multiple image lenses make possible the exposure of many thousands of images eliminating the time consuming step-and-repeat photography normally employed.

Therefore, the critical need for an inexpensive yet practical way for forming these lens matrices exists and is believed to be fulfilled by the method of the present invention.

SUMMARY OF THE INVENTION

In accordance with the foregoing, it is an object of the present invention to provide a simple and efficient method for accurately positioning material at predetermined points in a planar or composite structure.

It is a further object of the present invention to provide an inexpensive and dependable technique for creating three-dimensional structures, including therein large numbers of precisely positioned particulate inclusions.

It is yet an additional object of the present invention to provide a novel technique for building up three-dimensional structures containing dispersions in decoratively arranged patterns.

It is a further object of the present invention to provide an improved method of making a fly's eye lens master capable of replicating such a lens sheet of high lens density.

Now in accordance with the present invention the foregoing explicit objects and other implicit objects such as will become apparent upon reading the ensuing detailed specification are attained through the intermediate use of thermoplastic deformation imaging processes. Specifically, such processes are employed to create via optical or electrostatic imaging, a series of determinatively positioned and sized depressions in a thermoplastic planar surface. Upon cascading quantities of material intended for incorporation into the structure being established across the orderly depression-marked surface, individual portions of the material become entrapped in the various depressions. Adhesive means may subsequently be used to transfer the now ordered portions to their resting place in the formative block of material. The spaces between the various particles are appropriately filled in as required and the entire process may then be in essence repeated as many times as may be necessary to build up the desired three-dimensional configuration if desired.

BRIEF DESCRIPTION OF THE DRAWINGS

A fuller understanding of the present inventive process and the manner in which it is implemented may now best be gained by a reading of the following detailed specification, together with an examination of the drawing appended hereto, in which.

DESCRIPTION OF THE PREFERRED EMBODIMENTS

Figure 1:
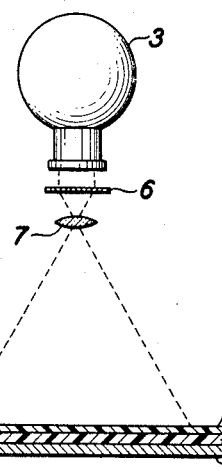
FIG. 1 diagrammatically illustrates the exposure step involved in the preferred optical preparation of the deformed thermoplastic surface utilized in conjunction with the present invention.

In FIG. 1 a deformable photosensitive member 1 is shown generally similar to members illustrated and discussed in U.S. Pat. No. 3,196,011, to K. W. Gunther and Robert W. Gundlach. The member is seen to include a conductive substrate at 2, commonly comprising a thin plate of aluminum, upon which is coated a photoconductive layer 4, over which in turn is coated a deformable thermoplastic layer 5. The photoconductive layer 4 may suitably comprise any of a large group of inorganic and organic materials, but for purposes of illustrating the invention may be considered to be formed of a vitreous selenium layer of the order of 20 microns in thickness. The overcoated thermoplastic layer 5 may also be chosen from a realtively sizable group of materials. A table listing a large number of suitable compositions is given at column 14 of the Gunther and Gundlach patent previously alluded to. By way of example, the layer 5 may be regarded as comprising stabilite ester 10 (glycerol triester of 50% hydrogenated wood resin). The thickness of this thin layer will, in the practice of the present invention, and for reasons to be subsequently set forth, be chosen with some variation. However, generally the thickness will fall within the approximate range of ½ to 15 microns.

Imaging structures somewhat at variance with that described in connection with FIG. 1 have been described extensively elsewhere in the literature in connection with various deformation imaging processes other than the electrostatic frosting methods disclosed in the referenced Gunther and Gundlach application. Such alternate structures would remain applicable to the present invention provided the thermoplastic layer undergoing deformation is uppermost on the structure (and is therefore accessible) and has sufficient thickness to produce the depressions required for the present inventive method. Reference here is made, for example, to such structures as are shown in U.S. Pat. No. 3,063,872 to E. M. Boldebuck in U.S. Pat. No. 2,985,866 to J. F. Norton and in U.S. Pat. No. 3,055,006 to A. W. Dreyfoos, Jr., et al. In all of these cases configurations are defined suitable for establishment of appropriate deformation image patterns from corresponding electrostatically formed patterns, although in some instances the structures shown do not include a photo conductive layer such as appears in the present FIG. 1. Formation of a latent eletcrostatic image on such structures would accordingly be more difficult than is the case where a photoconductive layer is present but could be accomplished, for example, by direct deposition of a charge image via a modulated electron gun operating in a vacuum system, or by a pin tube or the like.

It may be assumed in FIG. 1 that prior to the point in time at which the process step therein depicted takes place, the number 1 has been exposed to electrostatic charging from a suitable corona source. This charging technique is, of course, so well known to those skilled in the art of electrophotography as not to require further description. As now shown in FIG. 1 a projector 3 is provided which exposes the charged member 1 to a light pattern through an optical screen 6 and an objective lens 7. The screen 6 has a pattern thereon consisting of specifically arranged light portions upon an otherwise opaque background. For purposes of illustration it may be considered more specifically that the pattern comprises a series of ordered light transmissive dots against an otherwise darkened background. In many cases the screen 6 will thus resemble a half-tone screen; however, this will not necessarily be the case since it is intended that upon projection on the surface 5 those areas of the surface under the projected light areas will subsequently correspond to depressions in the deformation imaged thermoplastic surface. Accordingly, the precise pattern that appears on the screen will be in accord with the desired arrangement of depressions in the member 1, which in turn will depend upon the ultimate configuration desired for the beaded material, in the example of particulate material.

After the light exposure is made the thermoplastic material—as is customary in such deformation imaging processes—is subjected to recharging to produce electric field intensification in the light exposed areas, and then to heat or vapor softening, in consequence of which a series of generally circular or spherical pits or depressions form at points on the surface 5 corresponding to the light spots on the optical screen 6. The circumference of each such depression will of course corespond to the size of the individual projected spot on the charged member. Similarly, the density of the depressions will depend upon the density of the light spots on the optical screen 6. The depth of such depression, on the other hand, will show some variation, depending upon the particular materials utilized, the degree of material softening employed, the charging voltages utilized, and so forth. It will be evident to those skilled in the art, accordingly, that depending upon the particular sizes of the particles which one subsequently wishes to affix, the various parameters of the plate, including the thickness of the layer 5, may require some adjustment in order to achieve the most suitable depression depths.

In this connection it may be noted that the findings discussed in the patent application Ser. No. 476,533 of John C. Urbach entitled, "Image Storage," assigned to the same asignee of the instant application, and filed on Aug. 2, 1965, now U.S. Pat. No. 3,436,216, are particularly applicable. As is discussed at length therein, members of the type illustrated in FIG. 1 have been shown to exhibit a certain natural or resonant frequency of surface deformation, in the sense that depressions of greatest depth and most ready formation occur at depression spacing frequencies which are a function of the thickness of the thermoplastic layer employed. As applied to the instant discussion, this means that maximum depression depth may be achieved where the light screen 6 exhibits lightened areas having an appropriate spatial frequency of occurrence. In particular, and as the referenced application points out, where the film 5 has a thickness greater than approximately 2 microns, maximum depression depths tend to form where the screening frequency is approximately 1.5 to about 2.7 times the deformation film thickness. Similarly on films thinner than about 2 microns the wavelength of occurrence of charged areas causing maximum depression depth and most ready formation occurs at about 1.5 to about 5 times the thickness of the films. These findings may be advantageously employed in the present inventive process whenever the screening pattern upon screen 6 has a sufficient degree of regularity as to give a generally means spacing between adjacent light areas. In such cases the film thickness may be readily adjusted according to the foregoing criteria so as to assure the most ready and deepened formation of depressions.

In some instances in practice of the present invention it may prove desirable at this point in the process to overcoat the deformation imaged structure 1 with a several angstroms thick vacuum deposited metallic layer—as e.g. of elemental aluminum, nickel, or chromium. The reason for this is that certain of the common thermoplastic otherwise desirable for the present process tend to retain a tacky quality even after the softening heat or vapor influence is removed; and when relatively low kinetic energy particles are subsequently cascaded across the deformed surface—in a manner to be set forth—the tacky surface present with such materials could cause excessive arresting of particle energy. In general, however, it is desirable to avoid this overcoating aspect, since aside from introducing some avoidable complexity into the positioning process, it tends as well to limit ready re-imaging of the structure 1. It may be noted that generally such avoidance can be accomplished by carefully choosing the thermoplastic material comprising layer 5 on the basis of the type of particulate matter being positioned, and by furthermore maintaining careful temperature control throughout operation of the process.

Figure 2:
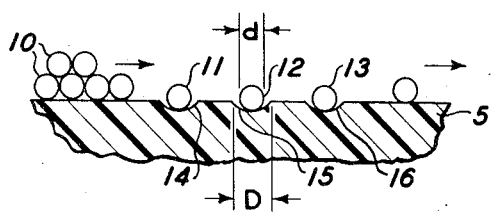
FIG. 2 depicts a magnified section of the deformed member of FIG. 1 after completion of the cascading step.

In FIG. 2 a portion of the now deformed thermoplastic surface 5 is shown on a magnified scale relative to the FIG. 1 depiction. Three typical depressions are shown at 14, 15 and 16. In accordance with the exemplary manner in which these depressions are formed they have a circular rim of diameter approximately as shown to be D. For purposes of illustrating one operation of the present invention it is assumed in FIG. 2 that one desires to accurately position particles such as those shown at 10, possessing a roughly spherical cross section of approximate diameter $d$. In accordance with the illustration it may also be assumed that large numbers of such particles are involved in the formative process and that all such particles have approximately the same diameter. All that is now necessary to position the several particles is to cascade—or in effect roll—the large number of particles such as at 10 across the surface 5. Provided that $d$ is less than D, particles entering depressions as at 14, 15 and 16 will be trapped therein whenever the kinetic energy of individual particles is less than the potential energy barrier presented to a particle once it is seated in an individual depression.

As indicated previously, the depression depth of these various "energy wells" may to some extent be controlled by choice of materials, charging potentials, utilization of natural resonant frequencies of materials and so forth. However, it is also clear that one may as readily, if not more readily, operate upon the kinetic energy of the cascading particles by minimizing such energy to achieve the maximum amount of entrapment. In physical terms, all that is necessary is to provide an extremely gentle cascading action, which is to suggest that the various particles 10 should be rolled across the surface 5 with a minimum particle velocity. In accordance with the foregoing, entrapped particles are shown as at 11, 12 and 13.

In some instances the entrapped particles as at 11, 12 and 13 may be utilized directly in situ. This may be most readily done, for example, by utilizing for the deformable layer 5 a compound member separable from the photoconductive substrate 4, such as that member depicted in FIG. 4 of the Gunther and Gundlach patent previously alluded to. In a case such as this, the thermoplastic layer 5 is backed by a dimensionally stable essentially non-softenable layer which in turn is—during imaging—in contact with the photoconductor 4 via a thin intervening layer of insulating low viscosity oil. When the combination is once separated from the photoconductive layer a thermoplastic material may thereafter be dusted over the layer 5 whereupon subsequent heat exposure firmly affixes the several particles to their entrapped positions.

However, in most instances this one aspect of the present process will be utilized in a repetitive manner to build up a three-dimensional matrix construction. For such purposes a transfer member 17 as seen in FIG. 3 is utilized which comprises essentially a sheet of dimensionally stable plastic, such as for example, polyethylene terephthalate upon which is coated a tacky but readily solvent soluble material such as, for example, natural beeswax or paraffin.

Many of the common commercially available sticky celluloid tapes are also suitable for use as transfer member 17. A specific example is the product "Scotch #810" tape available from the 3M Company of St. Paul, Minn., and fully described in U.S. Pat. Nos. 2,532,011 and 2,607,711.

Figure 3:
FIG. 3 diagrammatically illustrates the transfer of the position beads to an adhesive intermediate member.

The transfer sheet 17 is brought into firm contact with surface 5 as is shown in FIG. 3. Upon pulling the member 17 from the surface 5 the various particles are removed in their precise respective positions from the numerous depressions.

Figure 4:
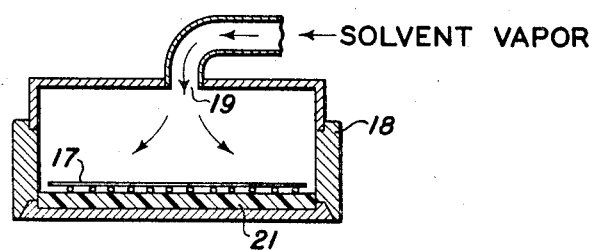
FIG. 4 diagrammatically illustrates the manner in which the beads are transferred from the adhesive member to their resting places in the formative block of material.

In FIG. 4 transfer member 17 is then placed face down in a molding box 18 at the bottom of which a smooth layer 21 of suitable thermoplastic material has already been formed. A solvent vapor atmosphere is introduced at inlet 19, the particular solvent being choesen to readily dissolve the tacky material present upon the face of member 17. Where the member 17 is of a material as previously indicated, the solvents trichlorethylene vapor or perchlorethylene vapor are readily utilized. Release of the various particles is thereby promptly effected and the particles are positioned in the same respective relationship on the surface of the thermoplastic layer 21. In order to achieve a minimum degree of movement during this transfer process it will ordinarily be desirable that the thermoplastic material 21 itself be at least slightly soluble in the solvent vapor utilized. Such characteristics insure that the degree of softening caused by presence of the vapor at the surface of layer 12 will introduce sufficient penetration between the particles and the surface of layer 21 as to firmly seat the particles.

Figure 5:
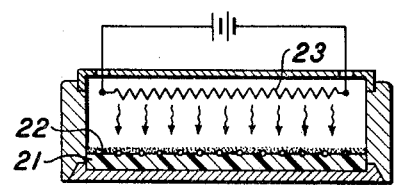
FIG. 5 illustrates the technique by which the beads are then permanently affixed in their respective positions.

Once this seating is accomplished a powdery layer 22 of the same thermoplastic material as comprises layer 21 is dusted over the seated particles as shown in FIG. 5. Radiant heating is than applied as by the coil 23 causing softening and solidification about the interspersed particles. As the matrix will subsequently be built up by repetition of the same basic technique, sufficient material will be deposited to form layer 22 to approximately sufficient depth to cover all the embedded particles, although in given instances greater or lesser degrees of layer thickness may be provided for 21.

The foregoing process may now be repeated as many times as necessary to build up a three-dimensional matrix of embedded particles to any degree as may be desired. It will, of course, be evident that differing patterns may be utilized from strata to strata in the matrix. All that is necessary to provide such result is to vary the particular screen pattern utilized in the successive imaging steps. As members of the type illustrated in FIG. 1 at 1 are particularly noteworthy for their reusability features, one may utilize the precise member for successive build up of strata even though the pattern of depressions may vary during the course of building up successive layers.

While one aspect of the invention has been particularly described for a situation where particles to be placed are all of approximately the same size, the technique will, of course, be relatively effective in almost any instance where the size distribution in a collection of such particles displays a reasonably prominent population peak. This is very much the case for most commercially available particulate compositions; which is to say that in most instances commercial particulate products do show a size distribution such that the vast majority of particles fall within a range enabling direct application of the foregoing technique. In most instances, furthermore, application of the technique will tend to lead to suitable results even where the distribution is not particularly peaked. Slight analysis shows why this is the case: wherein such a distribution the particles are larger than the formed depressions, they will not be entrapped in any event; where on the other hand they are only slightly smaller than the depression diameters, such particles will be retained and will yet prevent all but the smallest particles from being added to an already filled depression. Thus, the only problem arises where several quite small particles become entrapped in one given depression. Even in these instances, however, the result will usually be satisfactory in that the volume of material so entrapped will be reasonably close to the case for a single properly sized particle, and accordingly the resulting product will still retain a relatively high degree of uniformity.

Figure 6:
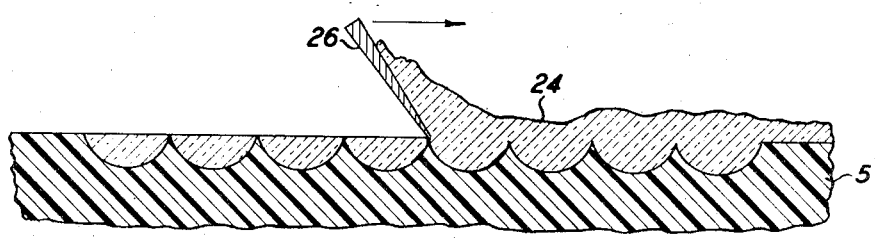
FIG. 6 illustrates the doctor blading step which follows the step of cascading a non-particulate material over the deformed surface of the member of FIG. 1.

With respect to the other aspect of the present invention, the formation of a high density lens matrix, the deformation procedure is substantially identical to that followed in the aforedescribed technique shown in FIG. 1. However, it is preferable in forming the depression to choose the proper materials, charging potential, and to utilize the natural resonant frequencies of the materials to generate depressions having maximum cross-section diameters as depicted in FIG. 6. As noted in this figure, the spherical depressions are that the deformable material intermediate adjacent depressions provides a substantially sharp ridge permitting the greatest proximity between adjacent depressions.

A flowable optical material 24 may then be cascaded across the deformed surface of member 5 to completely fill the depressions therein. After this cascading step, doctor blade 26 or other suitable devices may be used to remove any excess of the optical material 24 so as to provide a smooth planar surface superimposed over the deformed surface. In this manner, a matrix of lenses is provided assuming the utilization of a transparent thermoplastic material for member 5 having an index of refraction either greater or lesser than the index of refraction of the optical material 24, depending upon whether convergence or divergence is desired. Utilization of the lens matrix would necessitate the removal of the thermoplastic member 5 from the surface of the photoconductor 4 as previously mentioned. This may be achieved prior to or after the cascading step. The optical material 24 preferably is chosen so that it will harden after it is doctor bladed on deformed member 5.

The finished product of FIG. 6, once the deformed member 5 is removed from the photocondutive member 4, may be used as a high density lens matrix without further steps. However, it may be desirable to utilize the deformed member 5 as a mold for replicating high density lens matrices directly therefrom. If this is the situation, the doctor blading step following the imaging and deforming steps will proceed as shown in FIG. 7.

Figure 7:
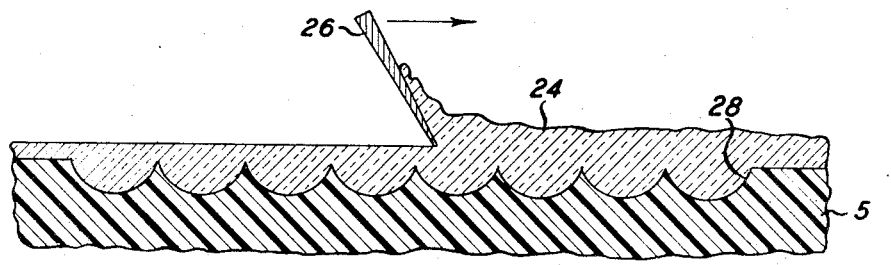
FIG. 7 shows another doctor blading step.

The step of FIG. 7 is different from the step of FIG. 6 in that the depressions are first treated with a thin layer of a suitable material such as oil, which prevents adhesion between and easy separation of the thermoplastic material 5 and the optical material 24. After the deformed surface is so treated, the optical material 24, such as an epoxy plastic, is cascaded across the deformed surface in a manner similar to that described in relation to FIG. 6. The doctor blading step is then performed to remove excess optical material as well as to provide a flat optical surface. This step is implemented so as to permit the spherical lenses formed by the optical material in the depression to be connected by common optical material as shown in the left portion of FIG. 7.

After this step, the optical material is permitted to harden and may then be stripped from the mold provided by the deformed member 5. It is understood that the doctor blading step may be replaced by a milling step after the optical material 24 has hardened so that the excess material is ground away to the degree desired.

As may be the case for some materials, the deformed thermoplastic layer 5 is vulnerable to physical force which may deform the depressions or wear the material to the point that it is no longer usable as a satisfactory mold. In this situation, the deformed member 5 may be utilized as a mold for forming a durable master which may then be employed to mass produce high quality high density lens matrices.

Figure 8:
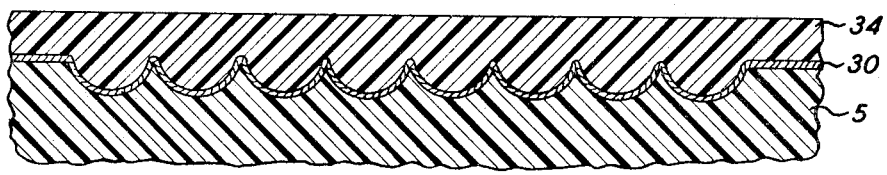
FIG. 8 shows a master making step prior to dissolution of the deformed member.

With reference to FIG. 8, a typical method of forming this master may be initiated by electro-forming a metallic surface 30 in intimate contact with the deformed surface of member 5. Following this step, a suitable material 34, such as an epoxy plastic, may be cascaded over the metallic coating and be allowed to harden thereby lending rigidity to the metallic coating once removed from the thermoplastic layer 5. This removal may be accomplished by first removing the thermoplastic layer from the photoconductive member 4 and then submitting the three-layer structure shown in FIG. 8 to a solvent which will dissolve the thermoplastic material but to which the rigid material 34 and the metallic coating 30 are insensitive. In this manner, a master plate will result having a metallic embossed surface corresponding to the metallic layer 30. This master may then be used to stamp lens matrices in other suitable optical materials.

Alternatively, the thermoplastic material may be dissolved and replaced with a rigid layer of material which may be similar to that comprising layer 34 instead of placing layer 34 on the concave side of the metallic coating 30 as shown in FIG. 8. This would permit the resulting master to provide convex lenses on suitable optical material instead of the concave lenses replicated from the master produced directly from the embodiment shown in FIG. 8.

While the present invention has been particularly described in terms of specific embodiments thereof it will be understood that in view of the present disclosure numerous modifications thereof and deviations therefrom may now be readily devised by those skilled in the art without yet departing from the present teaching. Accordingly, the present invention is to be broadly construed and limited only by the spirit and scope of the claims now appended hereto.

What is claimed is:

1. A method for positioning of particulate material comprising:
   (a) forming surface depressions at predetermined locations upon an otherwise smooth thermoplastic layer overlying a photoconductive layer and a conductive layer by establishing on said thermoplastic layer an electrostatic charge pattern by a process including the steps of charging said thermoplastic layer and exposing to a light pattern corresponding to said electrostatic pattern wherein areas of relatively high electric field intensity correspond to said predetermined locations and heat softening said layer so said depressions may form,
   (b) cascading said material across said deformed surface whereby said individual particles may fall into and become trapped in said depressions, said spherical particles being predominantly of one size in a range of one half to fifteen microns, and
   (c) transferring said entrapped particles to a three dimensional matrix configuration by
      (1) contacting said trapped particles with an adhesive transfer sheet,
      (2) separating said sheet with the adhering particles from said depressed thermoplastic surface,
      (3) spacing said sheet bearing said particles adhesive face down upon a second thermoplastic layer,
      (4) solvent releasing said particles from said transfer sheet whereby said particles are positioned on the face of said second thermoplastic sheet in their same relative position,
      (5) removing said transfer sheet,
      (6) dusting said particles with a thermoplastic particulate material to a depth sufficient to imbed said particles upon subsequent heat softening of said thermoplastic particulate material, and
      (7) heat softening said thermoplastic material.

2. A method according to claim 1 further including formation of additional strata in said matrix by repetition of said particle entrapment, transfer, and fixing steps.

3. A method for positioning optical lens material in a desired spatial array, said material being flowable in a first state and rigid in a second state, comprising the steps of:
   (a) forming surface depressions at predetermined locations in accordance with said desired array upon an otherwise smooth thermoplastic layer by establishing on said layer an electrostatic charge pattern wherein areas of relatively high electric field intensity correspond to said predetermined locations and softening said layer so said depressions may form; and, (b) completely filling said depressions with said optical material consisting of the step of cascading said material in said first state across said deformed surface; and, (c) allowing said optical lens material to achieve its rigid state.

4. A method according to claim 3 wherein said thermoplastic layer overlies a photoconductive layer and a conductive layer and said forming step includes charging said thermoplastic layer and exposing said photoconductive layer to a light pattern corresponding to said desired array.

5. A method according to claim 3 including the step of removing from said deformed surface that part of said material in excess of those portions of said material in said depressions.

6. A method according to claim 3 further including the step of removing said material from said deformed surface after said material has achieved its rigid state.

7. A method for forming a high density matrix master for replicating spherical lens matrices comprising the steps of:

(a) forming surface depressions at predetermined regular locations upon a normally smooth surfaced thermoplastic layer by establishing on said layer an electrostatic charge pattern wherein areas of relatively high electric field intensity correspond to said predetermined locations and softening said layer so said depressions may form;

(b) coating said depressions with a continuous metallic layer;

(c) cascading a first support material in a flowable state across said metallic layer whereby portions of said material fill any depressions therein;

(d) allowing said material to harden to provide a rigid support for the metallic layer; and, (e) removing said thermoplastic layer thereby exposing one surface of said metallic layer.

8. A method in accordance to claim 7 wherein said thermoplastic layer overlies a photoconductive layer and a conductive layer and in which said electrostatic pattern is established by a process including the steps of charging thermoplastic layer and exposing said photoconductive layer to a high density optical matrix of transparent and opaque areas corresponding to said electrostatic pattern.

9. A method according to claim 7 including the additional steps of:

(a) cascading a second support material in a flowable state across the surface of said metallic layer formerly in contact with said thermoplastic layer;

(b) allowing said second support material to harden to achieve rigidity; and, (c) removing said first support material thereby exposing one surface of said metallic layer.

10. A method according to claim 8 including the additional steps of:

(a) cascading a second support material in a flowable state across the surface of said metallic layer formerly in contact with said thermoplastic layer;

(b) allowing said second support material to harden to achieve rigidity; and (c) removing said first support material thereby exposing one surface of said metallic layer.

References Cited

UNITED STATES PATENTS

| | | | |
|---|---|---|---|
| 3,196,765 | 7/1965 | Walkup | 95—1.7 |
| 3,245,341 | 4/1966 | Childress et al. | 101—122 |
| 3,296,965 | 1/1967 | Reif et al. | 101—170 |
| 3,318,698 | 5/1967 | Schwertz | 96—1.1 |
| 3,322,537 | 5/1967 | Giamo | 96—1.1 |
| 3,389,655 | 6/1968 | Lorenc et al. | 101—157 |

GEORGE F. LESMES, Primary Examiner

J. C. COOPER III, Assistant Examiner

U.S. Cl. X.R.

18—1; 96—1.4; 117—17.5; 178—6.6; 340—173; 346—74; 350—178